United States Patent [19]

Fascenda et al.

[11] Patent Number: 5,345,227
[45] Date of Patent: * Sep. 6, 1994

[54] PAGER WITH MASK FOR DATABASE UPDATE

[75] Inventors: Anthony C. Fascenda, Pacifica; Daniel L. Gregg, San Francisco, both of Calif.

[73] Assignee: Newspager Corporation of America, South San Francisco, Calif.

[*] Notice: The portion of the term of this patent subsequent to Aug. 31, 2010 has been disclaimed.

[21] Appl. No.: 76,303

[22] Filed: Jun. 11, 1993

Related U.S. Application Data

[63] Continuation of Ser. No. 737,812, Jul. 29, 1991, Pat. No. 5,241,305, which is a continuation of Ser. No. 494,896, May 13, 1990, abandoned, which is a continuation of Ser. No. 193,011, May 12, 1988, abandoned, which is a continuation-in-part of Ser. No. 50,826, May 15, 1987, Pat. No. 4,845,491.

[51] Int. Cl.$^5$ .............................................. G08B 5/22
[52] U.S. Cl. ........................... 340/825.22; 340/825.44
[58] Field of Search ...................... 340/825.22, 825.44, 340/825.26, 825.27, 825.47; 455/38.1

[56] References Cited

U.S. PATENT DOCUMENTS 4,706,272 11/1987 Nishimura et al. ............ 340/825.52
5,241,305 8/1993 Fascenda et al. .............. 340/825.44

*Primary Examiner*—Michael Horabik
*Attorney, Agent, or Firm*—Townsend and Townsend Khourie and Crew

[57] ABSTRACT

A pager system in which individual pagers have a database is disclosed. The database can be updated by transmitting a mask code and update data. The mask code indicates a mask stored in the individual pager itself which receives the data. Using the mask code, the mask is identified and used to indicate positions in the database where data is to be written.

7 Claims, 5 Drawing Sheets

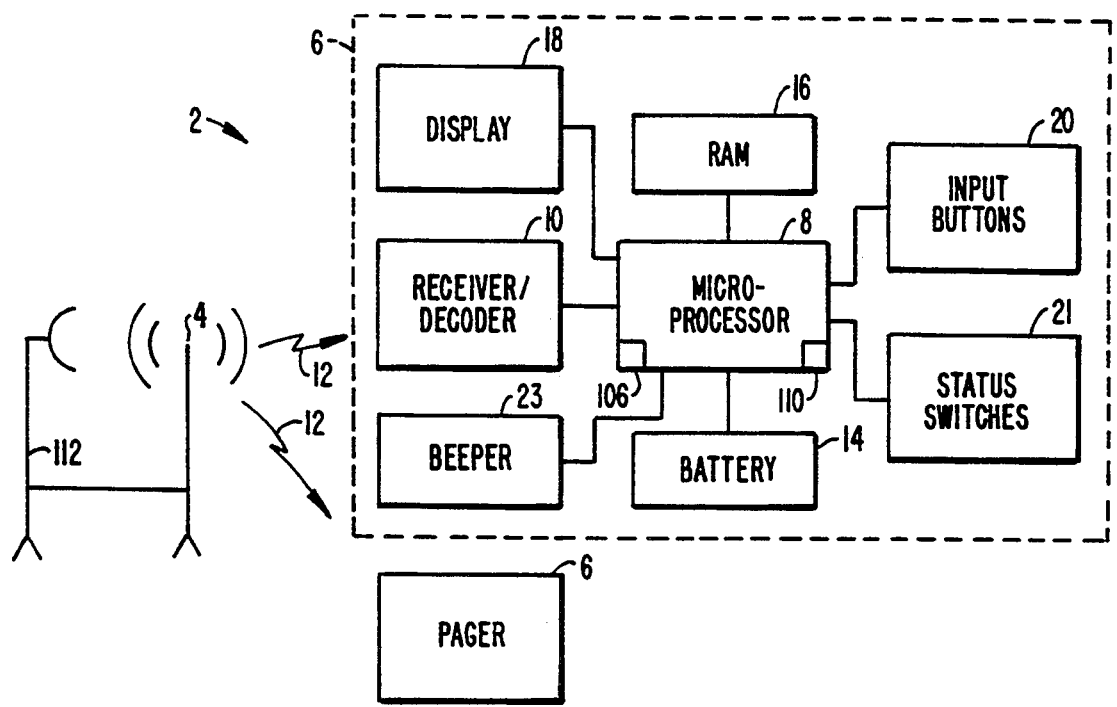
FIG._1.
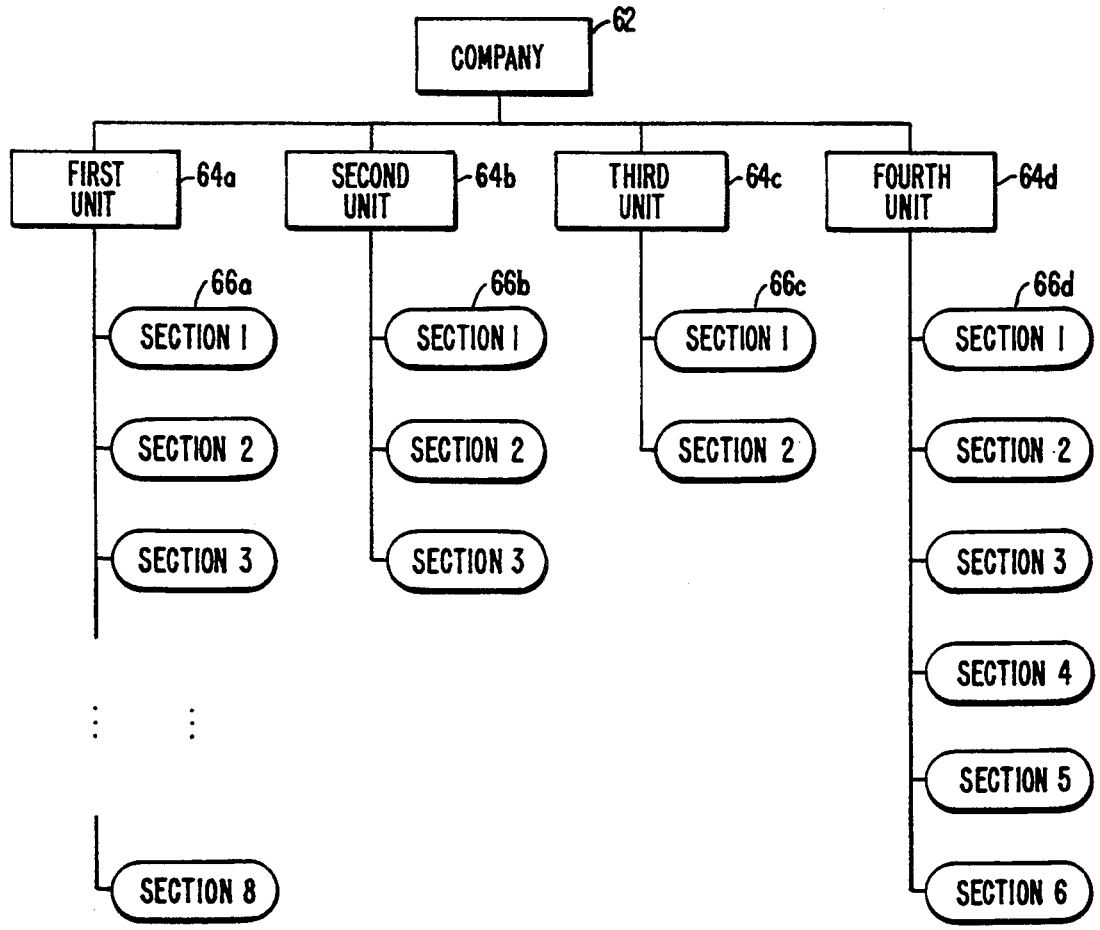
FIG._7.

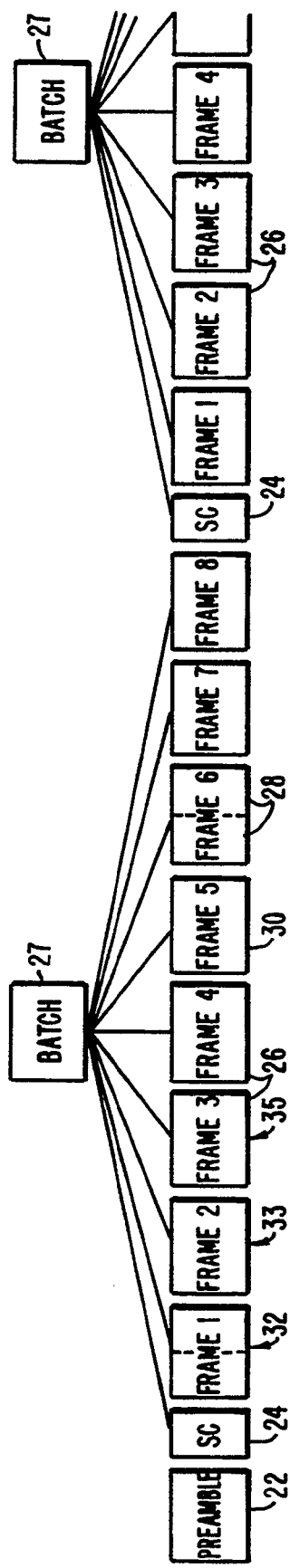
FIG._2. PRIOR ART
FIG._3. PRIOR ART
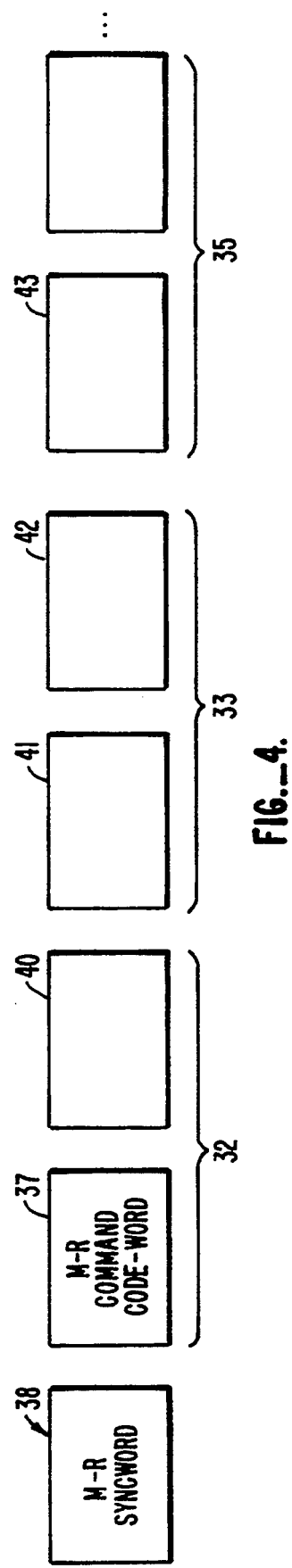
FIG._4.

| | 2-8 | 9-19 | 20-32 ,-37 |
|---|---|---|---|
| I | M-R COMMAND | COMMAND SPECIFIC DATA | ERROR CHECK |

| | 2-8 | 9-19 | 20-32 ,-37a |
|---|---|---|---|
| I | M-R GROUP MSG COMMAND | RESERVED | ERROR CHECK |

`39a`

| | 2-18 | 19 | 20-32 |
|---|---|---|---|
| I | M-R GROUP ID | RESERVED | ERROR CHECK |

| | 2-8 | 9-11 | 12 | 13-19 | 20-32 ,-37b |
|---|---|---|---|---|---|
| I | MLG MSG CMD | SUB-CMD | BEEP | RES | ERROR CHECK |

`39b`   `52`   `54`

| | ROOT ID | LEVEL ID | SUB-LEVEL ID | ERROR CHECK |
|---|---|---|---|---|
| I | | | | |

| | 2-8 | 9-11 | 12-19 | 20-32 ,-37c |
|---|---|---|---|---|
| I | DATABASE MSG CMD | RES | DATABASE ID | ERROR CHECK |

`39c`    `68`

| | 2-12 | 13-19 | 20-32 |
|---|---|---|---|
| I | START BLOCK | RESERVED | ERROR CHECK |

| | 2-8 | 9-11 | 12-19 | 20-32 ,-37d |
|---|---|---|---|---|
| I | ADD/DELETE COMMAND | FUNCTION | RES | ERROR CHECK |

`39d`   `89`   `40d`

| | 2-9 | 10-19 | 20-32 |
|---|---|---|---|
| I | M-R ID (M-R GROUP, MLG, DATABASE) | RES | ERROR CHECK |

`90`    `41d`

| | 2-18 | 19-20 | 21-32 |
|---|---|---|---|
| I | FIRST HALF ESN | RESERVED | ERROR CHECK |

`92`

| | 2-18 | 19-20 | 21-32 |
|---|---|---|---|
| I | SECOND HALF ESN | RESERVED | ERROR CHECK |

| 1 | 2-19 | 20-32 |
|---|---|---|
| 1 | DATE/TIME MESSAGE | ERROR CHECK |

(108)

| 1 | 2-19 | 20-32 |
|---|---|---|
| 1 | DATE/TIME MESSAGE | ERROR CHECK |

| 1 | 2-8 | 9-11 | 12-19 | 20-32 |
|---|---|---|---|---|
| 1 | MASK FILL COMMAND | MASK ID | DATABASE ID | ERROR CHK |

39f, 95, 68

| 1 | | | |
|---|---|---|---|
| 1 | START BLOCK | SKIP | ERROR CHECK |

| 1 | 2-8 | 9-11 | 12-19 | 20-32 |
|---|---|---|---|---|
| 1 | FORMAT COMMAND | COUNT | DATABASE ID | ERROR CHK |

39g, 100, 68

| 1 | 2-12 | 13-19 | 20-32 |
|---|---|---|---|
| 1 | START BLOCK | SKIP | ERROR CHECK |

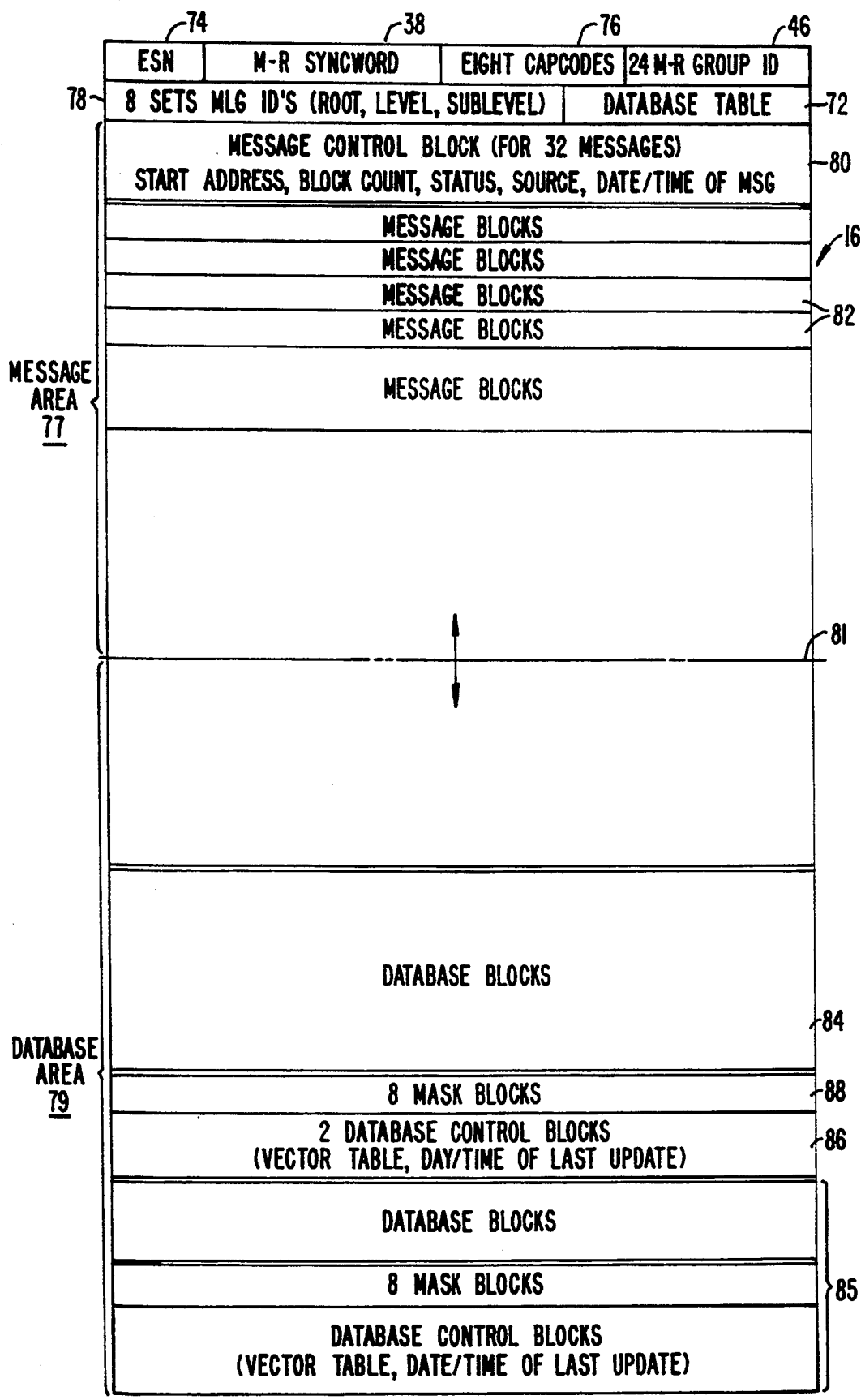
FIG._8.

PAGER WITH MASK FOR DATABASE UPDATE

This is a continuation of U.S. patent application Ser. No. 07/737,812, filed Jul. 29,1991, now U.S. Pat. No. 5,241,305, which is a continuation of application Ser. No. 07/494,896, filed May 13, 1990, abondoned, which is a continuation of application Ser. No. 07/193,011, filed May 12, 1988, abandoned, which is a continuation-in-part of application Ser. No. 07/050,826, filed May 15, 1987, now U.S. Pat. No. 4,845,491, the disclosure of which is incorporated by reference.

BACKGROUND OF THE INVENTION

Paging systems, which come in various levels of sophistication, have certain features in common. Individual subscribers to a paging system have pagers for receiving the paging system broadcasts. Each pager has an individual ID, called the capcode, stored in the pager. All the pagers in an area monitor broadcast messages from a central transmitter. Each message is intended for a particular pager and has that pager's capcode associated with the message. Thus, pagers in an area all monitor a certain frequency for broadcasts from the pager system transmitter looking for its capcode. When the capcode is present, that is when the capcode is broadcast by the transmitter, the message associated with the capcode, which typically follows the capcode, is acted upon by the pager.

The most basic type of pager is called a beeper. The message is simply an instruction to actuate the pager causing it to emit the familiar beep, illuminate an LED, or both. Another type of pager system is used to transmit numeric messages, typically a telephone number the recipient is to call. When the individual pager receives that pager's capcode, the accompanying message is typically stored in a read/write memory in the pager and displayed (then or later) on the pager's numeric display. More recently alphanumeric pagers have been introduced. The messages associated with these pager systems include both number and word messages which are received and stored by the recipient pager for display immediately or later.

One pager, called the PMR 2000 and made by Motorola is used for both individual messages, those directed to an individual pager, and group messages, those directed to a group of pagers. This type of pager can have one or more capcodes stored in the pager at the time of manufacture or stored in the pager by the local pager company. One capcode is the pager's individual ID while any other would be a group ID since more than on pager would have it.

There are several standard formats for paging broadcast. One format is called POCSAG. With this format any length message is possible. Many pager manufacturers have chosen this format because of its flexibility. Pagers using the POCSAG format "listen" for a broadcast from the pager transmitter for 40 msec out of each second. If the transmitter is not active usually only noise will be "heard" by the pager. As shown in FIG. 2, a transmission is initiated by broadcasting a preamble consisting of a square wave having a minimum of 576 reversals. Since the preamble is at least 1.125 seconds in length, every pager will "hear" the preamble signal during its periodic "listening" period.

Following the preamble a 32-bit synchronization code is transmitted. The synchronization used with the POCSAG format code is the binary coded hexidecimal number 7CD215DS. Following the synchronization code are eight frames, called a batch, containing the transmitted information. Each frame is made up of two 32-bit code-words. The 32-bit code-words have slightly different formats based upon whether they contain an address, identifying which of the two million pagers the message is intended for, or a message. FIG. 3 shows that a code-word containing an address has the most significant bit set to 0 while a code-word containing a message has the most significant bit set to 1.

Conventional pagers using the POCSAG format do not monitor each frame. Rather, each individual pager monitors only one of the frames, such as frame 5, to save their batteries. Thus, after the synchronization code is received the individual pager will not monitor the transmission until it is time for frame 5 to be transmitted. Since each frame takes 121.6 milliseconds, the pager in this example would start monitoring the transmitting transmission somewhat before 486.4 milliseconds after the end of the synchronization code. After monitoring its particular frame, the pager once again stops monitoring the broadcast until it is time for the next synchronization code to be broadcast, at which time the cycle starts again. Transmission of the synchronization codes allows the pagers to be synchronized with the broadcast to reduce timing errors. If there is no message to be transmitted in any of the eight frames in a particular batch, an idle code-word (7A89C197) is transmitted in each of the two code-words for that frame. This tells the pagers monitoring that frame that no message is being transmitted for those pagers during that batch.

Under the POCSAG format capcodes are 18 bits long. Therefore, up to 262,144 different capcodes are available. However, since each pager "listens" to one of eight frames, each capcode can be used eight times as an individual ID, once for each frame. With the POCSAG format the total number of capcodes possible is therefore over two million.

One drawback of the presently available pager systems is that they are not flexible. They are intended to provide the same message to one recipient or to a preset group of recipients only. Once the capcodes are set by the manufacturer or local paging company, the are not easily changed or removed from a pager.

SUMMARY OF THE INVENTION

The present invention is directed to a pager based information transmission system which uses a standard paging broadcast format to transmit both conventional private and group messages (using individual and group 18-bit capcodes provided, typically, by the local paging company) and unconventional multi-recipient (M-R) messages. The multi-recipient messages are received by only those individual pagers with authorized access to the multi-recipient message. The authority to receive M-R messages is provided by and taken away by an appropriate add/delete message broadcast over the air. This distinguishes the M-R messages of the invention from conventional group messages. Therefore, as used in this application, M-R messages are messages for which the authority to receive them can be provided by and taken away by an appropriate add/delete message broadcast over the air.

M-R messages, in the preferred embodiment. come in several forms. One is termed a database message. A database could relate to, for example, sports scores or to financial information. Another M-R message is called an M-R group message. An M-R group message may be transmitted, for example, only to doctors at a chosen hospital. A third type of M-R message is the multi-level group message (MLG message). This type of message provides a great deal of flexibility in determining what group of users among a larger group of users will receive a certain message.

When dealing with M-R messages, the pager first checks its internal memory to see if it is authorized to receive the message. This is done by comparing the database ID, M-R group ID or MLG ID transmitted by the local pager company with information stored in the pager.

Many other types of messages are also contemplated for use with the invention. For example, time update messages and messages which turn the pager off for a length of time can be used.

The system preferably uses software-controlled pagers having read/write memories for storing broadcast messages and for modifying the operation of selected pagers through over-the-air broadcasts. This arrangement permits great flexibility in the pager operation. Likewise, the internal memory organization for a certain class of multi-recipient messages (discussed below) can be altered as necessary by broadcasts.

The use of software controlled pagers has other significant advantages. One aspect of the invention is the recognition and appreciation that because high speed is not required, the various functions usually performed by components external of the processor, including those performed by read/write bus control chips, chip select logic control chips and address logic chips, can be performed by the software in the microprocessor. Since all basic operations are performed by a processor and RAM, the hardware required is greatly reduced in contrast with the requirements of conventionally designed microprocessor based systems. This reduces the cost and size of the pager.

The system also provides for a flexible hierarchy of storage and retrieval of multi-recipient messages. In the preferred embodiment only database messages are stored and retrieved in this way. (A hierarchical system of message storage and retrieval can be used for M-R group and MLG messages as well.) Assume that one database is sports. A three-level hierarchy or tree could be used to separate the sports information into, for example, four different sports, six teams per sport and up to 26 pages of information for each team. (In the preferred embodiment each page of information constitutes four twenty-character lines since the pager display has a display with four twenty-character lines.) Each page is divided into two blocks. A POCSAG batch is required to transmit a block. It is preferred that the hierarchy or tree structure be changeable by over-the-air broadcasts. Therefore, when football season is over, football could be deleted as a sport and baseball, with its own hierarchical organization, added. The broadcast changeable hierarchy structure for the database information provides the system with great flexibility in the organization, storage and access of database information.

MLG messages provide further flexibility when used with the pager. An MLG ID is a multi-part identification which is transmitted with the message and identifies a particular group of related recipients from a larger group. For example, assume all employees of a company has a pager and that there are five divisions in the company (sales, manufacturing, etc.) and each division has two or more sections (east coast sales, mid-west sales, etc.). The MLG ID for each pager would include a root ID (for the company), a level ID (for the particular division) and a sub-level ID (for the particular section). To transmit a MLG message to, say, all pagers in a particular division, the MLG ID could include the root ID and the division level ID with the sub-level ID blank (all zeros). This eliminates the need to transmit the same message to each pager in the division. It also eliminates the need to have a special M-R group ID for everyone of the possible permutations and combinations of groupings which might be useful.

MLG messaging is further enhanced by the use of subcommands. For example, an MLG message may include a root ID, a level ID, a sub-level ID and a subcommand which further identifies the set of pagers which are to receive the message. One such subcommand could be that the message is to be received by all pagers having the same root ID, the same level ID and all sub-levels from the broadcast sub-level down. Assuming the broadcast sub-level ID were 4, and assuming sub-level ID's range from 0 to 7, then all pagers at sub-levels 4, 5, 6 and 7 having the required root ID and level ID would all be enabled to receive the MLG message.

Each database occupies a certain area of memory in the pager. A portion of the memory for each database is occupied by several items, the most important being a vector table. The vector table defines the structure of the database, the number of subjects, items per subject and pages per item. This in turn defines the overall size of the database. The vector table is the first block of the database. The vector table tells the processor how the various buttons of the pager work. The ability to modify the vector table by over-the-air broadcasts gives the pager great flexibility in the selection, arrangement and display of data.

Another aspect of the database structure involves the use of masks which greatly speed up transmission of updating information in a database. For example, assume each page or display contained information for one baseball game. On a given day 12 pages in the database may be taken up with this information. Instead of transmitting 24 batches (two batches per page) of information to update those twelve pages of similarly formatted database, a single batch of information can often be used to transmit only updating information (scores, inning numbers, etc.).

Another aspect of the invention is that it provides the user with a real time pager clock. (Note, the pager is preferably always on even if it is "asleep", that is when it has its receiver/decoder turned off.) Using the pager clock, private and multi-recipient messages can be date and time stamped with the date and time of receipt. This permits the user not only to know when a message was received, but allows the user to review messages in, for example, chronological or reverse chronological order.

The pager clock, according to one aspect of the invention, is a non-user settable and is set by an over-the-air broadcast of time message. Subsequent time messages provide feedback to the pager to reset the pager clock. This is done by transmitting with each time message, the message number and a time correction regarding the actual time of broadcast of the previous time message. This over-the-air updating of a real time clock may be useful in a wide variety of applications in addition to pager based applications.

The pager preferably includes a unique electronic serial number (ESN) which is provided by the manufacturer in the memory of the pager. This is preferably a 64 bit number (two 32-bit code-words) and is used in addition to the capcode used as the pager ID supplied by the local pager company. This is used primarily for security control and accountability reasons. It also simplifies transmission of add/delete messages.

The pager itself preferably includes a conventional microprocessor having an internal RAM, used to store time messages, and an internal ROM, used to store the program controlling the pager and identifying the memory size of external RAM. The microprocessor is, in the preferred embodiment, coupled to a conventional receiver/decoder, used to receive the broadcast signal from the transmitter and convert the signal to a digital form useable by the microprocessor. The microprocessor is also coupled to a display, user input buttons and external RAM. The RAM has allocated regions for conventional private or individual messages, conventional group messages, M-R group messages, MLG messages and database messages. (In the preferred embodiment private, group, M-R group and MLG messages are stored in one region in RAM in the order in which received. They could, of course, each have separate sections in RAM.) Other broadcast information, such as database and message control information, MLG ID's and M-R group ID's, are also stored in RAM.

The input buttons of the pager are used to control the display of both conventional and multirecipient messages. For example, the user can choose the sports database, the particular sport, and the team so to access the database information stored in RAM on that team. When the private, group, M-R group and MLG messages are stored together, then accessing these messages together in, for example, reverse chronological order will cause the messages to be displayed by the pager intermixed with one another according to the time of receipt. In such cases the message itself can indicate if it is an individual, a group or an M-R group message. Other input buttons may be provided to initiate other operations, such as review first message, scroll through messages and delete messages. Since the buttons are software controlled, flexibility is maximized.

An additional feature of the invention is the ability of the user to flag certain types of messages. For example, assume that the user wants to know when information regarding a certain baseball team has been updated. The user could flag the page number in RAM relating to that team so that when that page number is addressed by the microprocessor an indication, typically an audible tone, can be produced notifying the user of this. Another type of flag could be used to provide an indication to the user whenever information on that page (display screen) has been changed since the last time the page was viewed.

In the preferred embodiment the information is stored in RAM in blocks. Each block of information consists of 40 characters, the number typically sent in one batch. Therefore two blocks of information in RAM can fill one display page 20 characters by four lines. In some situations the invention may wish to be used with larger display screens. For example, a display screen 80 characters wide may wish to be used. This type of display could be accommodated by transmitting the information into four parallel databases. The first batch of information would be stored in the first database, the second batch in the second database, etc. The first four batches would then be used to fill up the first two rows on the display. The invention permits this flexibility so that these types of M-R messages would only require their own special parallel code-word and software in the enlarged display pages. Pages having normal (e.g., 20 character) displays could be programmed to manipulate information intended to be displayed on a normal width display.

The invention could be used in many other applications, such as security. Security personnel would each have a pager. Certain group messages could be broadcast for receipt by all pagers while others could be broadcast for receipt by only one pager (a private message) or a selected group of pagers (an M-R group message or an MLG message). Messages could be tagged so the user cannot erase the message to provide a record of messages received by that user. If desired, the date and time each message was reviewed could also be recorded for later retrieval.

Other features and advantages of the invention will appear from the following description in which the preferred embodiment has been set forth in detail in conjunction with the accompanying drawings.

BRIEF DESCRIPTION OF THE DRAWINGS

FIG. 1 is a schematic representation of a pager based information system of the invention.

FIG. 2 illustrates the prior art POCSAG format.

FIG. 3 shows the POCSAG format for address and message code-words.

FIG. 4 illustrates the code-word sequence for a batch in the multi-recipient transmission format.

FIG. 5 illustrates the general structure of an M-R command code-word.

FIGS. 6A–6G show the formats for M-R group messages, MLG messages, database messages, add/delete messages, time messages, mask fill messages and format messages.

FIG. 7 shows the hierarchical arrangement of a three-level company in terms of MLG messages.

FIG. 8 schematically illustrates the arrangement of RAM 16.

FIG. 9 shows a typical display and is used to illustrate the use of mask fill and format memory commands of FIGS. 6F and 6G respectively.

DETAILED DESCRIPTION OF THE PREFERRED EMBODIMENT

Referring now to FIG. 1, a pager based information transmission system 2 is seen to include a pager system transmitter 4 and a number of pagers 6. Each pager 6 includes a microprocessor 8 coupled to a receiver/decoder 10 which receives broadcast signals 12 from transmitter 4 and transforms these signals to digital form acceptable by microprocessor 8. Microprocessor 8, powered by a battery 14, stores selected conventional private and group messages in random access memory (RAM) 16 for viewing by the user on display 18 through the user manipulation of input buttons 20 and status switches 21. A beeper 23, connected to microprocessor 8, is used to provide the familiar beeping sound when certain types of messages are received according to the position of status switches 21. To determine how system 2 works, the POCSAG pager transmission format will be discussed with reference to FIGS. 2 and 3.

At FIG. 2 the POCSAG format is illustrated. Pager 6, since it is based upon the POCSAG format, "listens" for a broadcast signal 12 from transmitter 4 for 40 milliseconds out of each second. If transmitter 4 is not active, usually only noise will be received by microprocessor 8 so that microprocessor 8 will turn off receiver/decoder 10 for the remainder of the second to conserve battery 14. A broadcast signal 12 from transmitter 4 is initiated by a preamble 22 which consists of a square wave having a minimum of 576 reversals. The square wave frequency is such that the preamble lasts at least 1.125 seconds. Therefore every pager 6 will have its receiver/decoder 10 turned on sometime during preamble signal 22.

Following preamble 22 a 32-bit synchronization code 24 is transmitted. Synchronization code 24 used with the POCSAG format is the binary coded hexidecimal number 7CD215D8. Following synchronization code 24, eight frames 26, each 64 bits in length, are transmitted. Synchronization code 24 plus the eight frames 26 make up a batch 27. Each frame is made up of two 32-bit code-words 28. Code word 28 has a slightly different format based upon whether it contains an address or a message. As seen in FIG. 3, if the most significant bit, identified as bit 1 in FIG. 3, is set to 0, bits 2-19 contain a pager ID or address while if bit 1 is set to 1, bits 2-21 contain a message. In the transmission of conventional private or group messages, the transmitted address must match one of the capcodes stored in RAM 16, the capcodes corresponding to the pager ID or the group ID's, typically stored in the pager by a local pager company. The remaining bits are used primarily for error correction.

Pager 6, as is conventional under the POCSAG format, does not leave its receiver/decoder 10 on to monitor broadcast signal 12 for each frame 26. Rather, microprocessor 8 has receiver/decoder 10 monitor only a particular one of the eight frames, such as the fifth frame 30. After synchronization code 24 is received by receiver/decoder 10 and provided to microprocessor 8, microprocessor 8 turns off receiver/decoder 10 until, in this example, fifth frame 30 is to be transmitted. Under the POCSAG format each frame takes 121.6 milliseconds to transmit so that microprocessor 8 would cause receiver/decoder 10 to begin monitoring broadcast signal 12 by 486.4 milliseconds after the end of synchronization code 24. After monitoring of fifth frame 30, microprocessor 8 instructs receiver/decoder 10 to shut off until it is time for the next synchronization code 24 to be broadcast by transmitter 4. The process then repeats. If there are no messages in any of the eight frames 26 following a synchronization code 24, an idle code-word (7A89C197—which is a special address code-word 34 since the most significant bit is 0) is transmitted in place of code-words 28 in such frame. Receipt of an idle code-word by microprocessor 8 tells the microprocessor that no message is present in that frame 26 for that batch 27.

The above-described POCSAG transmission format is conventional. Pager 6 is used to receive what is termed conventional private or group messages using the conventional POCSAG format discussed above. Upon receipt of a conventional message, pager 6 will store the message in RAM 16 and, as is conventional, may provide an audible or visual signal to the user according to the positions of status switches 21.

System 2 differs from conventional pager systems in that it can be used for the dissemination of multi-recipient (M-R) messages which can be received by more than one pager 6, the authority for receipt being granted and removed by over-the-air broadcasts. To do so a multi-recipient (M-R) syncword 38, see FIG. 4, is used in place of syncronization code 24 prior to first frame 32. M-R syncword 38 is different from synchronization code 24. Pager 6 monitors for synchronization code 24 and for M-R syncword 38. If synchronization code 24 is present, pager 6 reverts to operation under the conventional POCSAG format. If M-R syncword 38 is present, pager 6 operates ill its M-R mode described below.

Microprocessor 8, when it is provided an M-R syncword 38 followed by an M-R command code-word 37, see FIG. 4, knows that an M-R message is being transmitted. When this occurs microprocessor 8 instructs receiver/decoder 10 to continue receiving broadcast signal 12 and to continue providing signal 12 in appropriate decoded form to microprocessor 8.

Unlike the procedure pager 6 goes through with conventional private and group messages, during which an individual pager reads only one of the eight code-words 26, receiver/decoder 10 receives, processes and transfers to microprocessor 8 each code-word 28 for the entire batch 27 whenever an M-R syncword 38 is received. That is, receipt of M-R syncword 38 tells microprocessor 8 that the message is an M-R message, not a conventional message. If the M-R message continues after a batch, the process simply repeats with the retransmission of an M-R syncword 38 and so forth. All of the M-R message code-words shown in FIGS. 6A-6D, 6F and 6G, with the exception of the add/delete message code-word 37d of FIG. 6D, occupy no more than first frame 32. This leaves seven additional frames 26, including fourteen code-words 28, available for the M-R messages. These seven frames each include two sets of twenty message bits as shown in FIG. 3. By using seven bit ASCII characters, one batch 27 of an M-R message contains forty 7-bit ASCII characters. Thus, each batch 27 can transmit one block of data which will fill up half of display 18. This arrangement further enhances transmission efficiencies.

FIG. 5 illustrates the basic structure of a typical M-R command code-word 37. Bits 2-8 represent the particular M-R command 39. The four basic M-R commands relate to database messages, M-R group messages, MLG messages and add/delete messages for the over-the-air addition or deletion of database ID's, group ID's or multi-level group ID's. Additional commands can be provided by an appropriate M-R command 39.

Turning now to FIGS. 6A-6G, the various commands will be discussed. At FIG. 6A, M-R group message code-word 37a is shown to include an M-R group message command 39a at bits 2-8 in code-word 37a followed by an M-R group ID 46 at bits 2-18 in code-word 40a. Micro processor 8 recognizes command 39a and treats the data in bits 2-18 in code-word 40a as an M-R group ID 46 thus comparing it with a list of M-R group ID's 46 in RAM 16 (see FIG. 8). In the preferred embodiment RAM 16 includes space for up to 24 different group ID's, each being 4 bytes in length. If pager 6 is authorized to receive the M-R group message following M-R group message code-word 37a then the message is stored in RAM 16. The organization of RAM 16 will be discussed below after discussing the various types of messages.

FIG. 6B shows a first frame 32b including an MLG message code-word 37b and a second code-word 40b of the first frame 32b. Code-word 37b includes an MLG message command 39b at bits 2-8 followed by a sub-command 52 at bits 9-11 and a beep indicating bit 54 at bit 12. Code-word 40b has a root ID 56 at bits 2-12, a level ID 58 at bits 13-16, and a sublevel ID at bits 17-19. MLG messages are typically used in relatively large hierarchical organizations. To best understand the use of MLG messages, a three level example will be discussed. Other numbers of levels are also possible.

Turning now also to FIG. 7, assume a company 62 is separated into four operating units, 64a, 64b, 64c and 64d. Each operating unit has two to eight sections 66. MLG message command 39b tells microprocessor 8 that the message for that batch 27 is an MLG message. To see if pager 6 is authorized to receive the MLG message, root ID 56, corresponding to company 62, is checked in RAM 16 at 78 (see FIG. 8). Level ID's 58 correspond to units 64 while sub-level ID's 60 correspond to sections 66. In one scheme if all pagers in company 62 were to be authorized to receive the MLG message following first frame 32b, level ID 58 and sub-level ID 60 could be, for example, all zeros. If everyone in first unit 64a were to receive the MLG message, root ID 56 for company 62 would be present and the level ID 58 for first unit 64a would be present while the sub-level ID 60 could be zeros. If a particular section 66a under first unit number 64a of the company were to receive the MLG message, the sub-level ID 60 would include the section ID for that particular section.

The above-described system is quite useful. However, using sub-command 52 the flexibility and power of the multi-level group message is greatly increased. In the three bit sub-command 52, eight different subcommands are possible. Sub-command 52 indicates what other pagers aside from the group of pagers indicated by the group ID 56, level ID 58 and sub-level ID 60 are also to receive the MLG message. The following are samples of sub-commands 52 which are possible: 00- from this level and sub-level down; 01-from this level down to the indicated sub-level; 02-all pagers down to the indicated level and sub-level; 03-pagers down to the indicated sub-level from the entry level in each section; 04-all pagers at every level from the indicated sub-level and down. Using a sub-command in conjunction with the three ID's 56, 58 and 60 permits messages to be broadcast in a tailored fashion without the need for great numbers of group identifications which would be otherwise needed if most of the permutations and combinations of pager groupings were to be covered.

With beep bit 54 a 1, beeper 23 is activated when the MLG message is received by pager 6. The MLG message itself begins in the second frame 33. (A beep bit could be included with other M-R messages as well.)

Turning now to FIG. 6C, the format for a database message is disclosed. Database message code-word 37c includes a database message command 39c at bits 2–8 with a database ID 68 at bits 12–19. Code-word 40c indicates the start block 70 in RAM 16 at bits 2–12 while the database message itself begins in the second frame 33. When microprocessor 8 receives a database message command 39c, database ID 68 is compared against a table 72 (see FIG. 8) of database ID's 68 in RAM 16 which the particular pager 6 is authorized to receive. Database table 72 includes, in the preferred embodiment, space for 16 different database ID's, the starting and ending locations (based upon 40-character blocks) in RAM 16 of each database, and an indication whether or not pager 6 is authorized to receive information in that particular database. Therefore, to receive a database message, microprocessor not only checks to see if database ID 68 transmitted with database message command 37c is located in RAM 16, authorization to receive the database message for that particular database is also checked. Since the database ID 68 is 8 bits long, up to 256 possible databases are possible in the preferred embodiment, although room for only 16 has been set aside in RAM 16. Of course either number could be changed.

Start block 70 indicates where in the particular database, counting from the start of the database, the database message is to be stored. In this manner the same database in different pagers will all be arranged similarly even though the physical or logical location of the particular database in RAM 16 in different pagers may be different. For example, one pager 6 may have its databases arranged in the following order: 16, 28, 143, 57 and 13 while another pager may have its databases arranged in this order: 16, 56, 57, 28 and 32.

Turning now to FIG. 8, a schematic representation of the structure of RAM 16 is shown. As mentioned above, RAM 16 includes areas for database table 72, M-R syncword 38, a set of up to twenty-four M-L group ID's 46 and a set of up to eight MLG ID's 78. (Each MLG ID 78 include a root ID 56, a level ID 58 and a sub-level ID 60.) RAM 16 also includes an area for an electronic serial number (ESN) 74. The electronic serial number is placed into RAM 16 by the manufacturer. It is unique for each pager 6, as opposed to a capcode 76 (also stored in RAM 16) which, under POCSAG format, can be used for eight different pagers because each pager, when operating conventionally, reads only one of the eight frames 26. The reason for inclusion of both ESN 74 and conventional capcodes 76 will be discussed below.

RAM 16 includes space for eight different capcodes 76. As is conventional, the first capcode, often called a basecap, is unique for that pager and frame. The other seven capcodes, as is conventional, are provided for conventional group messages so that one of the additional capcodes can be used by a group of pagers which all interrogate the same frame, such as fifth frame 30.

RAM 16 also includes a message area 77 and a database area 79 separated by a conceptually moving or movable interface 81.

A message control block 80 is provided in message area 77 of RAM 16 to keep track of up to 32 different messages stored in RAM 16. In the preferred embodiment a block in RAM 16 is taken to be forty 7-bit characters, which equals one-half page of information which can be displayed on display 18 of pager 6. Message control block 80 contains a set of information for each of the up to 32 messages which can be stored in message blocks 82 in RAM 16. For each message a start address in RAM 16, a block count (which depends upon the length of the message), the status (new?, unread? protected message?, etc ), the source (individual, group, M-R group or MLG message), and the date and time of receipt of the message (taken from the internal clock 106 of microprocessor 8), is recorded in message control block 80. As suggested in FIG. 8, the interface 81 between message blocks 82 and database 85 can move depending upon how much room message blocks 82 and databases 85 take in RAM 16. In the preferred embodiment, messages are accessed in the order in which received so that an input button 20 to scan the messages will give the user the first message received which has not been read. Since all messages are, in the preferred embodiment, stored in the order in which received, all three types of messages (individual, group and M-R group) are stored together in time sequence in message blocks 82. If desired, other arrangements for storing messages could be used, such as having a separate storage area in RAM 16 for individual messages and for group and M-R group messages.

FIG. 8 also shows that each database 85 in RAM 16 includes two database control blocks 86 (and eight mask blocks 88 discussed below) used with database blocks 84. Database control blocks 86 (and mask blocks 88) are filled with information using the database message command 39c. Control blocks 86 include a vector table which defines how input buttons 20 and status switches 21 work for that particular database 85. For example, pushing a particular input button for the sports database may do one thing while pushing the same button for the financial database may perform a completely different function. Since the function of input buttons 20 is software controlled and is changeable by over the air broadcast, this provides a great deal of flexibility for the user. In addition to the vector table, the date and time of the last update of that particular database 85 is also included in database control blocks 86. This information is taken from the internal time clock 106 of microprocessor 8. Note the identification and authorization for the various databases 85 are found in database table 72 rather than in the database control blocks 86.

A very important aspect of the invention is the fact that the authority to receive M-R messages, including M-R group messages, MLG messages or database messages, can be added or deleted through over-the-air broadcasts. In the preferred embodiment the eight capcodes 76 could also be added or deleted through over-the-air broadcasts.

Referring now to FIG. 6D, to make an addition or deletion, an add/delete message code-word 37d is transmitted along with associated code-words 40d, 41d and 42d in first frame 32d and second frame 33d. Following add/delete command 39d in bits 2-8, bits 9-11 are used to specifically identify the function 89 which will be used to add or remove a database ID 68, add or delete an M-R group ID 46, or add or delete an MLG ID 78. Code-word 40d includes M-R ID 90 in bits 2-9 which identifies the particular M-R group ID 46, MLG ID 78 or database ID 68 which is to be added or deleted. In the preferred embodiment the identification of the particular pager 6 affected by the over-the-air addition and deletion message is by using ESN 74. The first and second halves 92, 94 of ESN 74 can be found at bits 2-18 of code-words 41d and 42d. Microprocessor 8, after reading add/delete command 39 and function 89 takes appropriate steps to add or delete appropriate ID's from the set of ML group ID's 46, the sets of MLG ID's 78 and the database ID's 68 in database table 72, all found in external RAM 16.

Using ESN 74 provides several advantages over capcodes 76. It gives everyone from the manufacturer down to the pager retailer much greater control over the use of pagers 6 and access to the database messages broadcast by transmitter 4. This permits the companies involved to ensure that only authorized pagers can receive the particular M-R message with much greater confidence than with pager company installed capcodes. Also, if a user fails to pay a required fee for receiving certain database messages, authority to receive the broadcasts can be quickly revoked without having to obtain physical possession of the pager.

Pages of database messages in memory are often formatted similarly. For example, if the database is sports and the database memory has scores for various teams, after the initial information is first transmitted character by character to fill up the 80 characters (two blocks) for each page or screen, updating information on that screen usually involves only a small number of the character spaces. FIG. 9 shows a typical display 18 having the essentially constant data indicated by letters X, Y, Z and Q while the positions at which the data changes are indicated by shallow U-shaped symbols. Assuming there is information for ten different baseball games stored in the sports database 85 within RAM 16, instead of transmitting 80 characters for each page of information, in the example of FIG. 9 only ten characters of information would need to be transmitted for each page.

To accommodate this, each database 85 has set aside room for eight complete 40 character masks in mask blocks 88 for each database 84. (Each 80-character display would thus require the use of two mask blocks 88.) A mask would typically have zeros everywhere but where certain portions of the database 85 is to be updated through a mask fill code-word 37f as shown in FIG. 6F. In the case of the database orientation of FIG. 9, zeros would be inserted everywhere but the ten places where the shallow U's are positioned. Thus, after a suitable mask has been transmitted and stored in a bit-mapped arrangement in mask blocks 88 using conventional database messages and after the certain portion of the particular database 85 has been filled with the individualized information (e.g., team names, etc.), a mask fill message including a mask-fill codeword 37f can be transmitted. Code-word 37f includes a mask fill command 39f at bits 2-8, a mask ID 95 at bits 9-11 and database ID 68 for the particular database. Code-word 40f includes the identification of the start block 96 at bits 2-12 identifying the starting block number, counting from the start of the database, the following mask fill information is to be written into. Bits 13-19 identify a skip number which tells microprocessor 8 how many blocks are skipped after each mask is filled.

The code-words following first frame 32f carry the mask fill information for several blocks strung together. In the example of FIG. 9, the first five characters of information transmitted as the mask fill message would be inserted into the appropriate positions for a particular block in memory for that database. (The next five characters for the display in the example of FIG. 9 would be transmitted by a subsequent mask fill message.) The program then jumps down the number of blocks identified by skip bits 98. Therefore, if each data record could be displayed on one page, that is two blocks, skip bits 98 would indicate skipping two blocks from the starting block to begin updating the next page in the database using the mask fill information. Thus, a mask fill is a special type of database update which greatly reduces the amount of time required to transmit updating information under certain circumstances.

Another way to speed up transmission time presents itself when a database 85 contains numerous records which contain the identical information located in the same place in a recurring pattern in the database. For example, in a financial database many words and spaces will be the same for each page of information to be displayed, such as the words open, close, high, low and so forth. Using a format memory code-word 37g, see FIG. 6G, these words which are duplicated, for example, in each page of memory in a database 85 are written into each page quickly. Format code-word 37g includes a format command 39g at bits 2-8 followed by a count 100 which provides the number of items (typically blocks) to format. Bits 12-19 of format memory code-word 37g has the database ID 68 to be acted on. Bits 2-12 of code-word 40g identifies the block of the particular database, again counting from the start of the database, at which the memory format procedure starts while skip bits 104 identify how many blocks are to be skipped after each time the format message is written into the database starting block.

Microprocessor 8 includes internal real time clock 106 which is used to date and time stamp all group, private and database messages. Clock 106 is set and reset by a date/time and correction message 108, shown in FIG. 6E, broadcast by transmitter 4. Message 108 is broadcast as a part of a database message (see FIG. 6C), that is starting with, the first code-word 41 of the second frames 33, and is twenty characters in length. If message 108 of FIG. 6E could be broadcast at the exact time coded in date/time message 108, clock 106 could be updated from the time message broadcast. However, the actual time of broadcast of a time message often varies by, for example, fifteen minutes from the time of broadcast listed in the message 108. Therefore, the time messages 108 of FIG. 6E cannot be used directly to set and reset clock 106. Rather, information in two time messages are used to do so in the manner discussed below.

The first six characters represent the date (dd, mm, yy), the next six represent the time (hh, mm, ss), the next four represent the correction (mm, ss) to the previous time message and the final three characters represent the time message number (nnn). For example the followering time message 108: 09278713235523551123 (which is transmitted in ASCII format and converted) represents:

| Date: | 09/27/87 |
|---|---|
| Time: | 13:23:55 (EST) |
| Correction: | +23 min 55 sec. |
| Time Message #: | 123 |

Microprocessor 8 reads and stores the time message information in internal RAM 110 in microprocessor 8 as well in the vector table located in the particular database control blocks 86 identified in the immediately preceding code-words 37c and 40c. Also, microprocessor 8 stores the actual time of receipt of the time message of FIG. 6E as determined by real time clock 106 in RAM 110 and in the appropriate database control block 86. There is room in RAM 110 for this time data for at least two time messages 108 plus associated times of receipt from real time clock 106. To update real time clock 106 after transmission of a time message number n, the following computation is made:

$$T_{n(new)} = t_{n-1} + C_n + (T_n - T_{n-1}),$$

Where:
$T_{n(new)}$ is the updated time used to reset real time clock 106,
$T_n$ is the time of receipt of time message number n taken from real time clock 106,
$T_{n-1}$ is the time of receipt of time message number n−1 taken from real time clock 106,
$t_{n-1}$ is the time taken from time message 108 of time message number n−1, and
$C_n$ is the time correction taken from time message 108 of time message number n.

In addition to updating real time clock 106, $T_{n(new)}$ is also used to replace $T_n$ in RAM 110. Note that $C_n$ is that correction value broadcast by time message number n but is used to correct the time broadcast by time message number n−1. Using this method an extremely accurate real time clock 106 is provided the user with no user input and without the requirement that the time signal be delivered at an exact time. This aspect of the invention is considered to be useful in other circumstances. For example, the real time clock in a VCR could be updated in this way.

The difference between the time as indicated in the time characters of time message 108 and actual time of the broadcast of time message 108 is preferably determined by transmitter 4 by using a separate receiver 112 near transmitter 4, receiver 112 being hard wired to the transmitter. From this transmitter 4 can compute time correction $C_n$.

Pager based information system 2 is used by transmitting broadcast signals 12 from transmitter 4 to pager 6 within the broadcast area. Signals 12 are received by receiver/decoder 10 in pager 6 which transforms the signals into a digital form acceptable to microprocessor 8. Microprocessor 8, after sensing the existence of a preamble signal 22, checks the first code-word following the preamble. If it is a synchronization code 24, microprocessor 8 reverts to convention POCSAG format interrogating one of the eight frames following for a capcode which matches one of eight capcodes 76 in RAM 16. If the first code-word is M-R syncword 38, microprocessor 8 knows that the transmission is of an M-R signal and thus begins to read each of the following frames 26. From the first frame 37 the M-R command 39 is read. The information following M-R command 39 is acted upon based upon which of several M-R commands, including M-R group message command 39a, MLG message command 39b, database message command 39c, and so forth, has been transmitted. For most of the messages, and in the preferred embodiment, all of the messages except for the add/delete message of FIG. 6D, all of the necessary command information is contained within first frame 32. Microprocessor reads first frame 32 (and in the case of add-/delete command 39d, second frame 33) and then acts upon the multi-recipient message 50 and the following code-words 28. Thus, in most cases, at least fourteen code words 28 are available for the M-R message 50 following the M-R command code-word 37. At the end of each batch 27, microprocessor 8 again checks for syncronization code 24 or M-R syncword 38 and acts upon the following information according to which of the two is present. If no message is to be transmitted in a particular batch 27, an idle code-word is transmitted in place of syncronization code 24 and M-R syncword 38 to tell microprocessor 8 that it may shut down receiver/decoder for the duration of the transmission of that batch 27.

Conventional individual and group messages as well as M-R group messages are all stored in chronological order in message blocks 82 in a single message area 77 of RAM 16. Typically the messages are reviewed in chronological order starting from the oldest message which has not yet been reviewed. Using input buttons 20, the messages in message area 77 can be accessed in other orders, such as all M-R group messages in reverse chronological order.

Database messages are stored in separate databases 85 which together constitute a database area 79 in RAM 16. As suggested in FIG. 8, message area 77 begins to be used from one side of RAM 16 while database area 79 begins to fill up RAM 16 from the other side. Of course the sides are only considered in a conceptual manner.

Thus the interface 81 between the message and database areas can "move" within RAM 16 depending upon needs. The movement or allocation of RAM 16 between message area 77 and database area 79 can be automatically controlled by microprocessor 8 or can be controlled by the user with microprocessor automatically doing the allocation in the case of a default by the user.

Modification and variation can be made to the disclosed embodiment without departing from the subject of the invention as defined in the following claims. For example, the invention has been discussed with respect to pagers. The invention could be used with other types of systems including transmitters and receivers as well.

What is claimed is:

1. A method for disseminating modifications to a database stored in a plurality of receivers, comprising the steps of:
   transmitting a mask code and mask data;
   storing in said receivers a mask indicating positions in said database where said mask data is to be written;
   examining a received message to detect said mask code; and
   writing, in response to said mask code, said mask data at said positions indicated by said mask.

2. The method of claim 1 further comprising the steps of:
   transmitting said mask to said receivers; and
   receiving and storing, in said receivers, said mask.

3. The method of claim 1 further comprising the steps of:
   storing a plurality of masks in said receivers, each mask having a corresponding mask ID;
   transmitting a mask ID with said mask data;
   comparing a received mask ID with the mask IDs stored in said receiver; and
   if said received mask ID matches a stored mask ID, retrieving a mask corresponding to said mask ID and writing said mask data at said positions in said database indicated by said mask.

4. A method for disseminating modifications to a database stored in a plurality of receivers, comprising the steps of:
   transmitting a mask code, mask ID and mask data;
   storing in said receivers a plurality of masks and mask IDs, each mask ID corresponding to a different one of said masks, each mask indicating positions in said database where said mask data is to be written;
   examining a received message for said mask code;
   comparing, in response to detecting aid mask code, a received mask ID to said stored mask IDs;
   if said received mask ID matches a stored mask ID, retrieving a mask corresponding to said mask ID; and
   writing aid mask data at positions in said database indicated by said retrieved mask.

5. The method of claim 4 further comprising the steps of:
   transmitting at least one of said masks and mask ID; and
   receiving and storing in said receivers said transmitted mask and mask ID.

6. The method of claim 4 further comprising the steps of:
   transmitting an indication of a number of blocks of data, for said retrieved mask; and
   repeatedly using said retrieved mask in said receivers to write different portions of said mask data on different pages of said database as indicated by said indication.

7. The method of claim 6 further comprising the steps of:
   transmitting a number of pages to be skipped after each use of said retrieved mask; and
   skipping, in said receivers, said number of pages after each write of mask data using said retrieved mask.

* * * * *